(12) United States Patent
Terada et al.

(10) Patent No.: US 10,618,563 B2
(45) Date of Patent: Apr. 14, 2020

(54) FRAME MEMBER FOR VEHICLE

(71) Applicant: MAZDA MOTOR CORPORATION, Hiroshima (JP)

(72) Inventors: Sakayu Terada, Hiroshima (JP); Koji Miyamoto, Aki-gun (JP); Atsushi Gonokuchi, Hiroshima (JP); Takashi Yuuma, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/980,633

(22) Filed: May 15, 2018

(65) Prior Publication Data
US 2018/0334192 A1   Nov. 22, 2018

(30) Foreign Application Priority Data

May 16, 2017  (JP) ................. 2017-096968

(51) Int. Cl.
| | | |
|---|---|---|
| *B62D 25/20* | (2006.01) | |
| *B62D 25/02* | (2006.01) | |
| *B62D 21/02* | (2006.01) | |
| *B62D 29/00* | (2006.01) | |

(52) U.S. Cl.
CPC .......... *B62D 25/025* (2013.01); *B62D 21/02* (2013.01); *B62D 29/008* (2013.01)

(58) Field of Classification Search
CPC .... B62D 25/08; B62D 25/087; B62D 25/085; B62D 25/025; B62D 25/2018; B62D 25/2027; B62D 25/2036; B62D 21/03; B62D 21/02; B62D 21/152; B62D 21/157; B62D 29/008

USPC ...... 296/209, 187.09, 187.1, 187.11, 187.12, 296/203.01–203.04, 204, 205
See application file for complete search history.

(56) References Cited

U.S. PATENT DOCUMENTS

| | | | | |
|---|---|---|---|---|
| 5,727,826 A | * | 3/1998 | Frank | ........................ B60J 5/042 293/102 |
| 6,258,465 B1 | * | 7/2001 | Oka | ..................... B62D 21/157 148/690 |
| 6,672,654 B2 | * | 1/2004 | Yamada | ..................... F16F 7/12 296/146.6 |

(Continued)

FOREIGN PATENT DOCUMENTS

| | | |
|---|---|---|
| JP | H11-170935 A | 6/1999 |
| JP | H11-255048 A | 9/1999 |

*Primary Examiner* — Dennis H Pedder
(74) *Attorney, Agent, or Firm* — Studebaker & Brackett PC

(57) ABSTRACT

A frame member for a vehicle comprises a first side wall, a second side wall provided on an inward side, in a vehicle width direction, of the first side wall, an upper wall and a lower wall, which are configured to form a structure of the closed cross section of the frame member together with the first and the second side walls, an upper-side lateral rib and a lower-side lateral rib, which are respectively provided between the upper and lower walls to interconnect the first and the second side walls and extend linearly, when viewed from the longitudinal direction of the frame member, an upper-side vertical rib provided to face the first side wall and interconnect the upper wall and the upper-side lateral rib, and a lower-side vertical rib provided to face the first side wall and interconnect the lower wall and the lower-side lateral rib.

9 Claims, 13 Drawing Sheets

(56) References Cited

U.S. PATENT DOCUMENTS

| | | | | |
|---|---|---|---|---|
| 7,374,219 B2* | 5/2008 | Brennecke | ........... | B62D 29/002 |
| | | | | 296/187.02 |
| 7,695,040 B2* | 4/2010 | Brennecke | ........... | B62D 29/002 |
| | | | | 296/187.02 |
| 8,011,721 B2* | 9/2011 | Yamada | ................. | B62D 25/02 |
| | | | | 296/209 |
| 8,474,583 B2* | 7/2013 | Nagwanshi | ............. | B60R 19/34 |
| | | | | 188/371 |
| 8,573,571 B2* | 11/2013 | Langhorst | ............... | F16F 7/121 |
| | | | | 267/136 |
| 9,051,984 B2* | 6/2015 | Buron | ..................... | B60R 19/03 |
| 10,293,861 B2* | 5/2019 | Jeong | ................. | B62D 25/2036 |
| 10,308,286 B2* | 6/2019 | Yang | .................... | B62D 25/025 |
| 10,315,595 B2* | 6/2019 | Keller | ..................... | B60R 19/00 |
| 2003/0042763 A1* | 3/2003 | Yamada | .................... | F16F 7/12 |
| | | | | 296/205 |
| 2016/0114667 A1* | 4/2016 | Ikeda | ....................... | B60K 1/04 |
| | | | | 180/68.5 |
| 2018/0065667 A1* | 3/2018 | Maier | .................... | B62D 21/02 |

* cited by examiner

FRAME MEMBER FOR VEHICLE

BACKGROUND OF THE INVENTION

The present invention relates to a frame member for a vehicle which is configured to have its longitudinal direction which extends in a vehicle longitudinal direction and have a closed cross section.

In a frame member of a vehicle, such as an automotive vehicle, which constitutes a vehicle body, such as a side sill, the high strength-and-rigidity is required to secure the safety of a passenger in a vehicle collision, and also the lightweight is required to improve the fuel-economy (gas millage) performance. Accordingly, the frame member is generally configured to have a closed cross section. Further, the frame member is configured such that a reinforcing member is attached inside a closed-cross-section shaped frame body for reinforcing the frame body in order to suppress buckling of the frame member, for example.

Japanese Patent Laid-Open Publication No. H11-255048 (FIG. 6A), for example, discloses a frame member, in which a bending portion is provided at a plate-shaped reinforcing member which interconnects one side face of a rectangular-shaped frame body and the other side face which faces the one-side face, and a plate-shaped support member is provided to extend from the bending portion of the reinforcing member toward an upper face of the frame member which is adjacent to the above-described side faces.

Herein, in the frame member disclosed in the above-described patent document, the frame member has two-stage buckling with a fulcrum of the bending portion which occurs when a load is inputted to the frame member from the above-described one-side-face side. The above-described patent document, however, does not refer to specific studies about a two-stage buckling manner of the frame member, and there is room for improvement on the mass efficiency of EA (Energy Absorption) against a collision.

SUMMARY OF THE INVENTION

Accordingly, an object of the present invention is to improve the EA mass efficiency against a side-face collision in the frame member for the vehicle which is configured to have the longitudinal direction thereof which extends in the vehicle longitudinal direction and have the closed cross section.

The present invention is a frame member for a vehicle which is configured to have a longitudinal direction thereof which extends in a vehicle longitudinal direction and have a closed cross section, the frame member comprising a first side wall, a second side wall provided on an inward side, in a vehicle width direction, of the first side wall, an upper wall and a lower wall, which are configured to form a structure of the closed cross section of the frame member together with the first side wall and the second side wall, an upper-side lateral rib and a lower-side lateral rib, which are respectively provided between the upper wall and the lower wall to interconnect the first side wall and the second side wall and extend linearly, when viewed in the longitudinal direction of the frame member, an upper-side vertical rib provided to face the first side wall and interconnect the upper wall and the upper-side lateral rib, and a lower-side vertical rib provided to face the first side wall and interconnect the lower wall and the lower-side lateral rib.

According to the present invention, node portions (in other words, connection portions) are respectively formed at the upper wall and the upper-side lateral rib by connecting of the upper-side vertical rib to the upper wall and the upper-side lateral rib, and also other node portions (i.e., connection portions) are respectively formed at the lower wall and the lower-side lateral rib by connecting of the lower-side vertical rib to the lower wall and the lower-side lateral rib. Thereby, when a load is inputted to the first side wall from the outward side, in the vehicle width direction, of the frame member in the side-face collision (a pole side-face collision of the vehicle, for example), the frame member has two-stage buckling with a fulcrum of the node portions. Accordingly, compared with buckling occurring in a single-stage manner, a buckling load is larger. Moreover, since the upper-side lateral rib and the lower-side lateral rib extend linearly, when viewed in the longitudinal direction of the frame member, the load inputted to the first side wall from the outward side is transmitted to an inward side, in the vehicle width direction, of the frame member and also the buckling load of the frame member is large. Consequently, the EA mass efficiency against the side-face collision can be improved.

In an embodiment of the present invention, the upper-side lateral rib and the lower-side lateral rib are configured to extend in non-parallel to each other, when viewed in the longitudinal direction of the frame member.

According to this embodiment, since the upper-side lateral rib and the lower-side lateral rib where the node portions are respectively formed are configured to extend in non-parallel to each other, when viewed in the longitudinal direction of the frame member, it is possible to control a buckling direction so that respective directions of buckling of plural plate portions which are respectively formed by the node portions and positioned adjacently, in a vehicle vertical direction, to each other are reverse. Thereby, compared with a case where the above-described buckling directions are the same, the buckling load can be larger.

In another embodiment of the present invention, each of the upper-side vertical rib and the lower-side vertical rib is configured to have a node portion at a portion of each of the upper wall and the lower wall which is positioned on an outward side, in the vehicle width direction, of a central portion of each of the upper wall and the lower wall, when viewed in the longitudinal direction of the frame member.

According to this embodiment, the buckling load of a portion where a stress concentration occurs when the load is inputted to the first side wall from the outward side, in the vehicle width direction, of the frame member can be improved.

In another embodiment of the present invention, each of the upper-side vertical rib and the lower-side vertical rib is configured to have a node portion at a portion of each of the upper-side lateral rib and the lower-side lateral rib which is positioned on the outward side, in the vehicle width direction, of a central portion of each of the upper-side lateral rib and the lower-side lateral rib, when viewed in the longitudinal direction of the frame member.

According to this embodiment, the buckling load of the portion where the stress concentration occurs when the load is inputted to the first side wall from the outward side, in the vehicle width direction, of the frame member can be further improved.

In another embodiment of the present invention, a reinforcement portion is provided at a portion of each of the upper wall and the lower wall which is positioned on the outward side, in the vehicle width direction, of the node portion, when viewed in the longitudinal direction of the frame member.

According to this embodiment, the buckling load of the portion where the stress concentration occurs when the load is inputted to the first side wall from the outward side, in the vehicle width direction, of the frame member can be large.

In another embodiment of the present invention, the reinforcement portion provided at the upper wall is a thick portion which is provided at a portion of a lower face of the upper wall, and an upper face of the upper wall is a flat surface.

According to this embodiment, assembling of another member onto the upper face of the upper wall is improved.

In another embodiment of the present invention, the first side wall extends in a vehicle vertical direction, when viewed in the longitudinal direction of the frame member, and the upper-side lateral rib extends upward and inward, in the vehicle width direction, when viewed in the longitudinal direction of the frame member, and the lower-side lateral rib extends downward and inward, in the vehicle width direction, when viewed in the longitudinal direction of the frame member.

According to this embodiment, since the first side wall extends in the vehicle vertical direction, when viewed in the longitudinal direction of the frame member, the load inputted from the outward side, in the vehicle width direction, of the frame member can be uniformly received by the first side wall, so that the buckling load is large. Further, since the upper-side lateral rib and the lower-side lateral rib respectively extend obliquely upward and inward, in the vehicle width direction, and obliquely downward and inward, in the vehicle width direction, when viewed in the longitudinal direction of the frame member, the above-described effect of the present invention that the EA mass efficiency against the side-face collision is improved can be attained concretely.

In another embodiment of the present invention, a high-strength portion is provided at each of a corner portion of the first side wall and the upper-side lateral rib and a corner portion of the first side wall and the lower-side lateral rib, each corner portion being configured to have an acute angle.

According to this embodiment, upward bending is suppressed at an outward-side plate portion, in the vehicle width direction, of the upper-side lateral rib which is provided by the node portion, and downward bending is suppressed at an outward-side plate portion, in the vehicle width direction, of the lower-side lateral rib which is provided by the node portion. Thereby, the buckling direction is guided to a desired direction, so that the above-described effect of the present invention that the EA mass efficiency against the side-face collision is improved can be attained securely.

In another embodiment of the present invention, at least one of the upper-side lateral rib and the lower-side lateral rib is configured to slant with a slant angle of 1-20 degrees relative to the vehicle width direction, when viewed in the longitudinal direction of the frame member.

According to this embodiment, the buckling direction can be stabilized, maintaining the EA mass efficiency at a high level, by setting the above-described slant angle at 1 degree or more, and the high-level EA mass efficiency can be attained, stabilizing the buckling direction, by setting the above-described slant angle at 20 degrees or less.

In another embodiment of the present invention, a vehicle-vertical direction of buckling which occurs at an upper-side bending portion which is constituted by the upper wall and the upper-side lateral rib when a load is inputted to the upper-side bending portion from an outward side, in the vehicle width direction, of the frame member is configured to match a direction of buckling which occurs at a lower-side bending portion which is constituted by the lower wall and the lower-side lateral rib when the load is inputted to the lower-side bending portion from the outward side in the vehicle width direction, when viewed in the longitudinal direction of the frame member.

According to this embodiment, since the vertical buckling direction of the upper-side bending portion and the buckling direction of the lower-side bending portion match each other, the buckling load applied to the upper-side bending portion and the lower-side bending portion can be uniformized, so that the buckling direction of the frame member as a whole can be stabilized properly.

Another aspect of the present invention is a frame member for a vehicle which is configured to have a longitudinal direction thereof which extends in a vehicle longitudinal direction and have a closed cross section, the frame member comprising a first side wall, a second side wall provided on an inward side, in a vehicle width direction, of the first side wall, an upper wall and a lower wall, which are configured to form a structure of the closed cross section of the frame member together with the first side wall and the second side wall, and an upper-side lateral rib and a lower-side lateral rib, which are respectively provided between the upper wall and the lower wall to interconnect the first side wall and the second side wall, when viewed in the longitudinal direction of the frame member, wherein node portions which respectively form inward-side plate portions and outward-side plate portions are provided at the upper wall, the upper-side lateral rib, the lower-side lateral rib, and the lower wall, plural outward-side plate portions of the outward-side plate portions which are positioned adjacently, in a vehicle vertical direction, to each other have reverse directions of buckling which respectively occur when a load is inputted from an outward side, in the vehicle width direction, of the frame member, and plural inward-side plate portions of the inward-side plate portions which are positioned adjacently, in the vehicle vertical direction, to each other have reverse directions of buckling which respectively occur when the load is inputted from the outward side in the vehicle width direction.

According to this aspect of the present invention, since the node portions which respectively provide the inward-side plate portions and outward-side plate portions are formed at the upper wall, the upper-side lateral rib, the lower-side lateral rib, and the lower wall, the frame member has the two-stage buckling with the fulcrum of the node portions when the load is inputted to the first side wall from the outward side, in the vehicle width direction, of the frame member in the side-face collision (the pole side-face collision of the vehicle, for example), so that the buckling load is larger, compared with buckling occurring in the single-stage manner. In particular, since the plate portions which are positioned adjacently, in the vehicle vertical direction, to each other have the reverse buckling directions, the buckling load is larger, compared with a case where the plate portions have the same buckling direction. Thus, the EA mass efficiency of the frame member against the side-face collision can be improved.

Other features, aspects, and advantages of the present invention will become apparent from the following description which refers to the accompanying drawings.

DETAILED DESCRIPTION OF THE INVENTION

Figure 1:
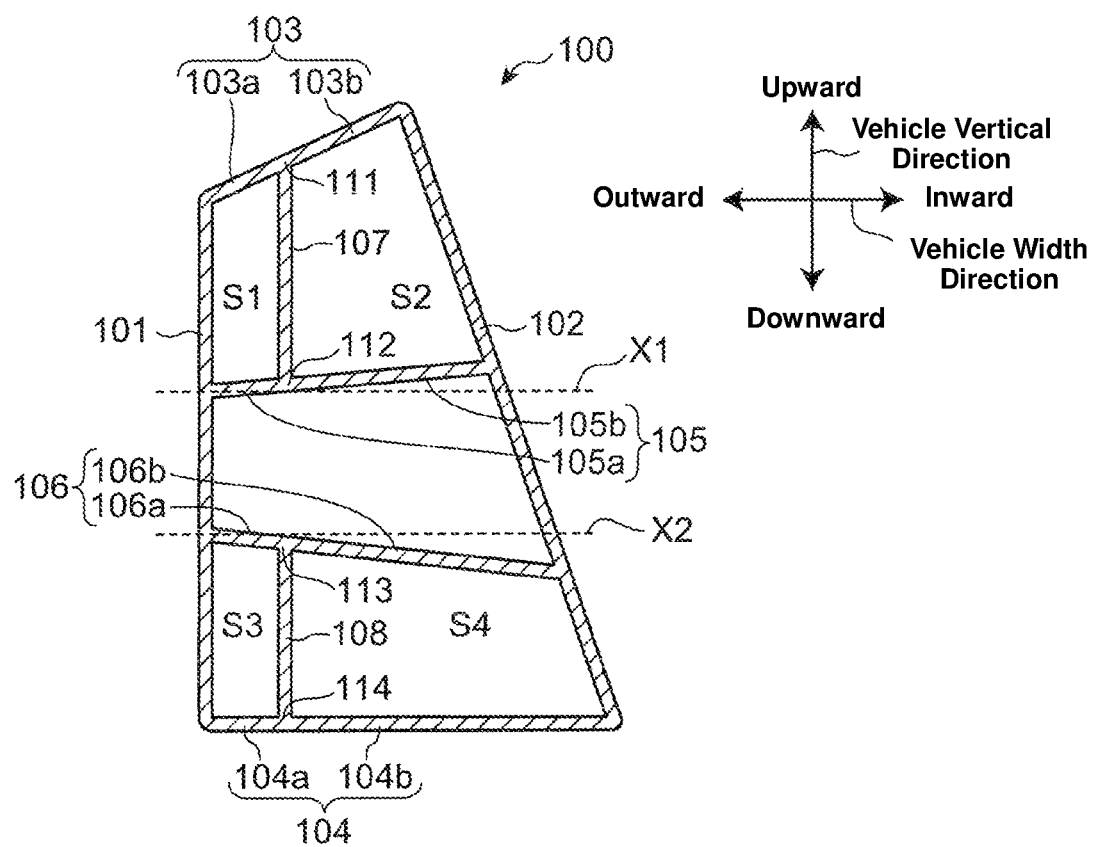
FIG. 1 is a sectional view showing a frame member according to a first embodiment of the present invention.

Hereafter, embodiments of the present invention will be described specifically referring to the drawings.

Embodiment 1

A frame member 100 shown in FIG. 1 constitutes a part of a vehicle body, and is provided such that its longitudinal direction extends in a vehicle longitudinal direction. Herein, the vehicle longitudinal direction is a direction which is perpendicular to a vehicle vertical direction and a vehicle width direction. However, it is to be understood that the direction defined by each term of "vehicle longitudinal direction," the "vehicle vertical direction," and the "vehicle width direction" which are used in the present invention may have some tolerance as long as the substantial operation/ effect of the present invention can be attained.

FIG. 1 is a sectional view showing a cross section of the frame member 100 which is perpendicular to a longitudinal direction of the frame member 100 (hereafter, referred to as a "longitudinal direction" simply). This is likewise in other sectional views. The frame member 100 is configured such that when a load is applied in a vehicle collision (a side collision of the vehicle, for example), it has bending deformation (i.e., bending deformation occurs at the frame member 100), thereby absorbing the load. The frame member 100 is applicable to a pair of side sills which are provided at a vehicle-body lower portion on both end portions, in the vehicle width direction, of the vehicle, a pair of right-and-left front side frames which are provided to extend in the vehicle longitudinal direction in front of a dash panel which partitions a cabin from an engine room, or the like.

The frame member 100 is made by extrusion molding. Alternatively, this may be made by press forming. In a case where the frame member 100 is made by the extrusion molding, an exemplified material making the frame member 100 includes aluminum, aluminum alloy, magnesium, or magnesium alloy.

The frame member 100 comprises a first side wall 101, a second side wall 102, an upper wall 103, and a lower wall 104. These walls 101-104 constitute a closed-cross-section structure which is of a rectangular shape as a whole.

The first side wall 101 is provided on an outward side, in the vehicle width direction, of the frame member 100. The first side wall 101 extends in the vehicle vertical direction, when viewed in the longitudinal direction of the frame member 100 (i.e., in a cross section perpendicular to the longitudinal direction, which is shown in FIG. 1 and others).

The second side wall 102 is provided on an inward side, in the vehicle width direction, of the first side wall 101. The second side wall 102 is provided to slant relative to the vehicle vertical direction such that its lower side is positioned on the inward side in the vehicle width direction. A structure in which the second side wall 102 slants as shown in FIG. 1 is an exemplified design in a case where the frame member 100 is applied to the side sill and connected to cross members 21, 22, 23 (see FIG. 11). Accordingly, the present invention is not limited to this, but the second side wall 102 may be provided to extend in the vehicle vertical direction, when viewed in the longitudinal direction, for example.

The upper wall 103 slants upward toward the inward side, in the vehicle width direction, of the frame member 100. This slant structure of the upper wall 103 is an exemplified design in which the frame member 100 is applied to the side sill and a hinge pillar or the like are connected to an upper side of this frame member 100. The upper wall 103 and the lower wall 104 preferably extend linearly in the vehicle width direction, when viewed in the longitudinal direction. Accordingly, the upper wall 103 and the lower wall 104 are a flat wall, respectively. An upper face of the upper wall 103 may be configured to be a flat surface so that the assembling performance of another member (the hinge pillar in the case where the frame member 100 is applied to the side sill, for example, as described above) is improved.

The frame member 100 further comprises an upper-side lateral rib 105 and a lower-side lateral rib 106 which are provided between the upper wall 103 and the lower wall 104. The lower-side lateral rib 106 is provided below the upper-side lateral rib 105. The lateral ribs 105, 106 interconnect the first side wall 101 and the second side wall 102. The lateral ribs 105, 106 extend lineally, when viewed in the longitudinal direction. Accordingly, the lateral ribs 105, 106 are a flat plate-shaped member, respectively. While the number of lateral rib interconnecting the first side wall 101 and the second side wall 102 is not limited to two, it has been found that in a case where each width of the upper wall 103 and the lower wall 104 (the size in the vehicle width direction) is different from each length (the size in the vehicle vertical direction) of the first side wall 101 and the second side wall 102 (i.e., the shape of the frame member 100 is substantially a rectangle as a whole, not a square, when viewed in the longitudinal direction) like the frame member 100 shown in FIG. 1, the higher EA mass efficiency can be obtained by providing an even number of lateral ribs.

As described above, respective slant angles of the lateral ribs 105, 106 are preferably 1-20 degrees relative to the vehicle width direction. In the illustrated sample, the upper-side lateral rib 105 slants upward with a slant angle of 1 degree relative to the vehicle width direction (illustrated by a broken line X1 in FIG. 1), and the lower-side lateral rib 106 slants downward with a slant angle of 5 degrees relative to the vehicle width direction (illustrated by a broken line X2 in FIG. 1).

Figure 2:
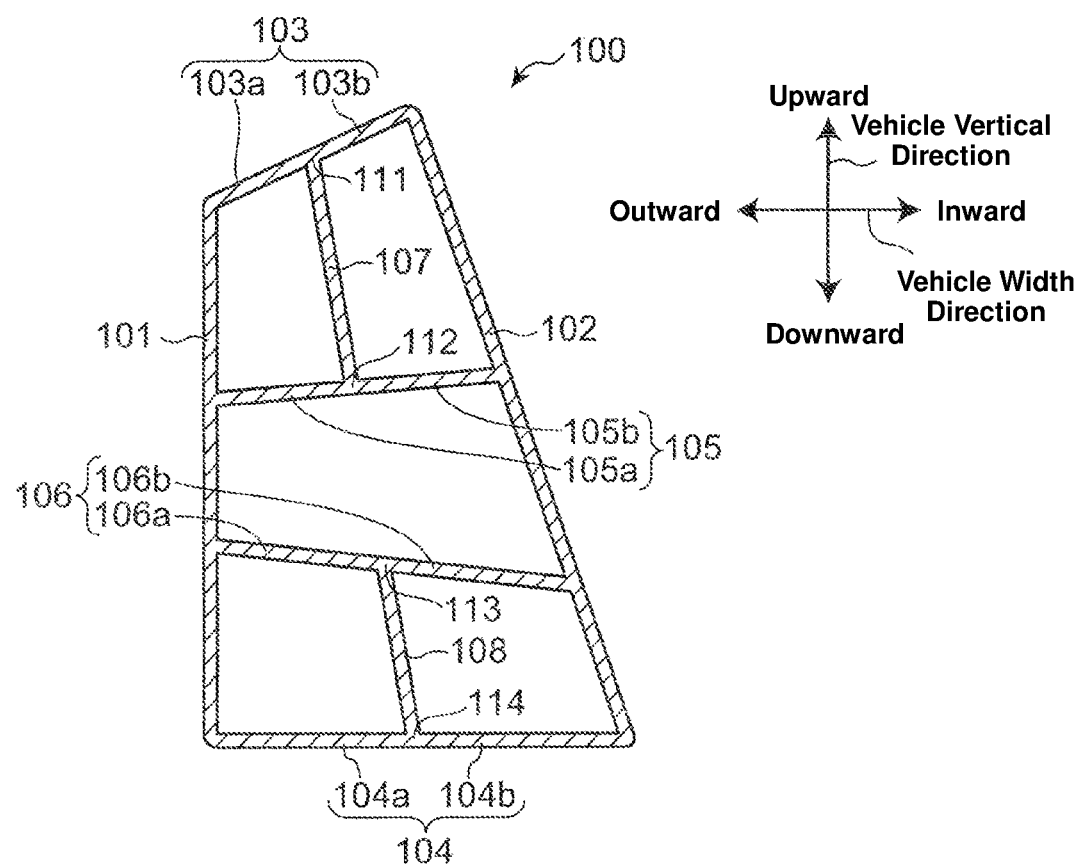
FIG. 2 is a sectional view showing a frame member according to a modified embodiment of the first embodiment of the present invention.

The frame member 100 further comprises an upper-side vertical rib 107 and a lower-side vertical rib 108. The upper-side vertical rib 107 interconnects the upper wall 103 and the upper-side lateral rib 105. The lower-side vertical rib 108 interconnects the lower wall 104 and the lower-side lateral rib 106. The vertical ribs 107, 108 may be provided over a whole range in the longitudinal direction or provided at a partial range in the longitudinal direction which corresponds to the lateral ribs 105, 106. FIG. 1 shows the example where the vertical ribs 107, 108 extend in parallel to the first side wall 101 (i.e., the vertical ribs 107, 108 extend in the vehicle vertical direction). The present invention is not limited to this structure where the two lines or faces are perfectly parallel to each other (i.e., the distance between the two is constant), but any other structure where they are not perfectly parallel to each other should be included in a scope of the present invention as long as the substantial operation/effect of the present invention can be attained. As a modified example in this regard, the vertical ribs 107, 108 may extend in non-parallel to the first side wall 101 as shown in FIG. 2 (i.e., the vertical ribs 107, 108 may slant relative to the vehicle vertical direction, when viewed in the longitudinal direction).

Figure 3:
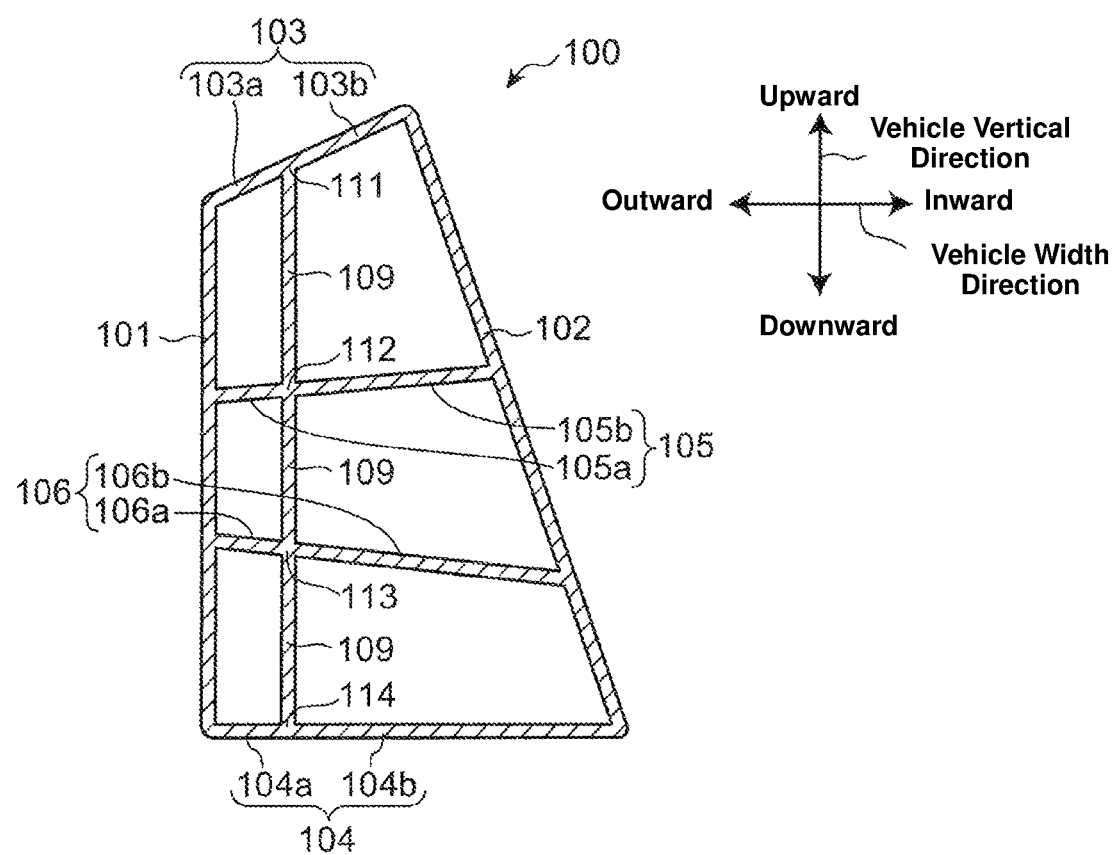
FIG. 3 is a sectional view showing a frame member according to another modified embodiment of the first embodiment of the present invention.

FIG. 1 shows the example where the upper-side vertical rib 107 and the lower-side vertical rib 108 are separated from each other in the vehicle vertical direction. As a modified example, the upper-side vertical rib 107 and the lower-side vertical rib 108 may be integrated such that a single vertical rib 109 extends in the vehicle vertical direction as shown in FIG. 3 (or slants relative to the vehicle vertical direction).

Anode portion 111 is formed at the upper wall 103 by connecting of the upper-side vertical rib 107 to the upper wall 103. A node portion 112 is formed at the upper-side lateral rib 105 by connecting of the upper-side vertical rib 107 to the upper-side lateral rib 105. A node portion 113 is formed at the lower-side lateral rib 106 by connecting of the lower-side vertical rib 108 to the lower-side lateral rib 106. A node portion 114 is formed at the lower wall 104 by connecting of the lower-side vertical rib 108 to the lower wall 104.

An outward-side wall portion 103a is formed at the upper wall 103 on the outward side, in the vehicle width direction, of the node portion 111, and an inward-side wall portion 103b is formed at the upper wall 103 on the inward side, in the vehicle width direction, of the node portion 111. An outward-side wall portion 105a is formed at the upper-side lateral rib 105 on the outward side, in the vehicle width direction, of the node portion 112, and an inward-side wall portion 105b is formed at the upper-side lateral rib 105 on the inward side, in the vehicle width direction, of the node portion 112. An outward-side wall portion 106a is formed at the lower-side lateral rib 106 on the outward side, in the vehicle width direction, of the node portion 113, and an inward-side wall portion 106b is formed at the lower-side lateral rib 106 on the inward side, in the vehicle width direction, of the node portion 113. An outward-side wall portion 104a is formed at the lower wall 104 on the outward side, in the vehicle width direction, of the node portion 114, and an inward-side wall portion 104b is formed at the lower wall 104 on the inward side, in the vehicle width direction, of the node portion 114. In the present description, the "wall portion" and the "rib portion" will be respectively referred to as a "plate portion" sometimes.

A closed cross section which is partitioned by an upper portion of the first side wall 101, an upper portion of the second side wall 102, the upper wall 103, and the upper-side lateral rib 105 is divided into two closed cross sections S1, S2 by the upper-side vertical rib 107. A closed cross section which is partitioned by a lower portion of the first side wall 101, a lower portion of the second side wall 102, the lower wall 104, and the lower-side lateral rib 106 is divided into two closed cross sections S3, S4 by the lower-side vertical rib 108. The frame member 100 has two-stage buckling with a fulcrum of the node portions 111-114 when a load is inputted to the first side wall 101 from the outward side in the vehicle width direction (in particular, to a whole part of a main face of the first side wall 101 from a direction which is vertical to the main face) in such a manner that the closed cross sections S1, S3 have bucking first, and subsequently the closed cross sections S2, S4 have buckling.

The node portions 111, 114 are positioned on the outward side of respective central portions, in the vehicle width direction, of the upper wall 103 and the lower wall 104, when viewed in the longitudinal direction. Further, the node portions 112, 113 are positioned on the outward side of respective central portions, in the vehicle width direction, of the upper-side lateral rib 105 and the lower-side lateral rib 106, when viewed in the longitudinal direction.

Figure 4:
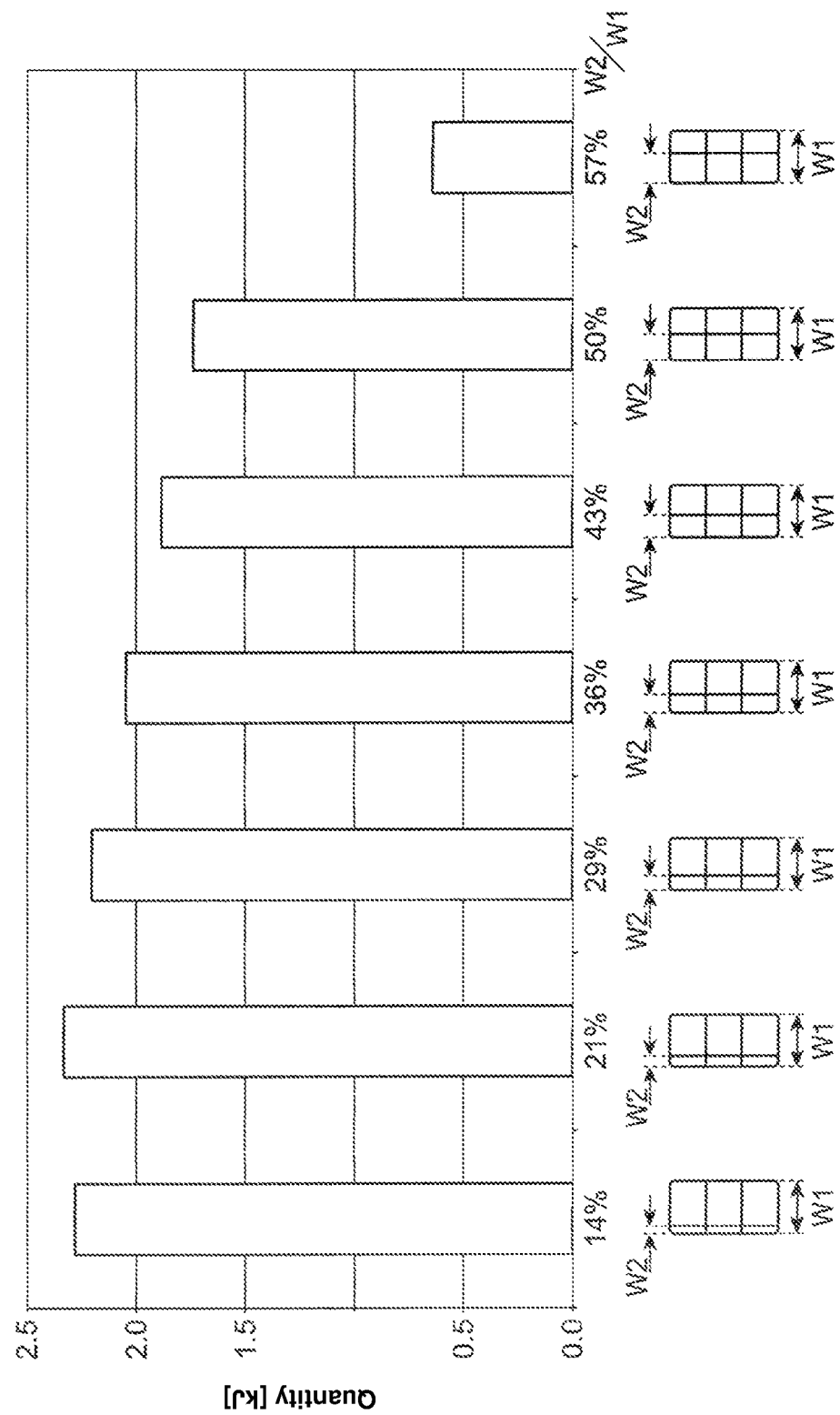
FIG. 4 is a graph showing a relationship between a ratio W2/W1 of a width W2 of an outward-side wall portion relative to a whole width W1 and an EA quantity, when an upper wall and a lower wall are viewed in a longitudinal direction.

Herein, a relationship between a ratio W2/W1 of a width W2 of the outward-side wall portions 103a, 104a relative to a whole width W1 and an EA quantity, when the upper wall 103 and the lower wall 104 are viewed in the longitudinal direction is shown in FIG. 4. This is the relationship which was obtained by a CAE analysis. Specifically, a three-point bending analysis by a columnar pole was conducted. A diameter of the pole was 250 mm. The frame member 100 as a subject was configured such that a whole length (a size in the vehicle longitudinal direction) was 1300 mm, a whole width W1 was 70 mm, and a height (a size in the vehicle vertical direction) of the first side wall 101 was 140 mm. Further, in this analysis, the frame member 100 had a substantially rectangular shape, when viewed in the longitudinal direction. That is, the upper wall 103 extended in the vehicle width direction, when viewed from the vehicle width direction, and the second side wall 102 extended in the vehicle vertical direction. Further, the lateral rib 105, 106 extended in the vehicle width direction, when viewed in the longitudinal direction. A material of the frame member 100 was aluminum. A plate thickness of the walls 101-104 and the ribs 105-108 was 2.0 mm.

A result of the analysis shown in FIG. 4 is indicated by the following chart.

CHART 1

| | Length of Outward-Side Wall Portion (W2/W1) | | | | | | |
|---|---|---|---|---|---|---|---|
| | 14% | 21% | 29% | 36% | 43% | 50% | 57% |
| EA Quantity (kJ) | 2.28 | 2.33 | 2.20 | 2.04 | 1.88 | 1.74 | 0.64 |

As apparent from FIG. 4, if the ratio W2/W1 of the width W2 of the outward-side wall portions 103a, 104a relative to the whole width W1 is 50% or smaller, the high EA mass efficiency can be obtained. Meanwhile, if the ratio W2/W1 is too small, there is a possibility that the above-described two-stage buckling may not occur at the frame member 100. A situation where the ratio W2/W1 is too small may cause a difficulty in making the frame member 100 by the extrusion molding. Specifically, if the ratio W2/W1 is small, that is, the width (the size in the vehicle width direction) of the closed cross sections S1, S3 is small, the size of a mold for making the closed cross sections S1, S3 is so small that there is a concern that the strength (rigidity) of the mold may not be secured properly. In view of the tentative size of the frame member 100, by setting the ratio W2/W1 at 15% or larger, the frame member 100 can properly have the two-stage buckling and also the frame member 100 can be made properly.

Next, a manner of the buckling of the frame member 100 which occurs when the load is inputted to the frame member 100 from the outward side in the vehicle width direction in the side-face collision (the pole side-face collision, for example) will be described.

When the load is inputted to the first side wall 101 from the outward side, in the vehicle width direction, of the frame member 100, this load is transmitted to the second side wall 102 which is positioned on the inward side in the vehicle width direction by way of the upper wall 103, the upper-side lateral rib 105, the lower-side lateral rib 106, and the lower wall 104. In the present embodiment, since the first side wall 101 extends in the vehicle vertical direction, when viewed in the longitudinal direction, the load inputted from the outward side in the vehicle width direction can be received uniformly by the first side wall 101, so that the buckling load of the frame member 100 is large. Further, since the upper wall 103, the upper-side lateral rib 105, the lower-side lateral rib 106, and the lower wall 104 of the present embodiment extend linearly, when viewed in the longitudinal direction, the load inputted to the first side wall 101 from the outward side in the vehicle width direction is easily transmitted to the second side wall 102 and also the buckling load of the frame member 100 is large. Herein, the closer an extension direction of the lateral ribs 105, 106 is to a direction which is vertical to the first side wall 101, the larger the load-transmission performance and the buckling load of the frame member 100 is. Moreover, since the vertical ribs 107, 108 extend in parallel to the first side wall 101, when viewed in the longitudinal direction in the present embodiment, a buckling length for the load inputted to the first side wall 101 from the outward side in the vehicle width direction can be secured uniformly in the vehicle vertical direction, so that the buckling load of the frame member 100 is large.

If the load inputted to the first side wall 101 is large, the flame member 100 has the buckling as a whole. Herein, the frame member 100 has the two-stage buckling with the fulcrum of the node portions 111-114 in such a manner that the closed cross sections S1, S3 have the bucking first, and subsequently the closed cross sections S2, S4 have the buckling. Accordingly, compared with a case where the frame member has a single-stage manner (where the vertical ribs 107, 108 are not provided, for example), the buckling load of the frame member 100 is larger.

In the frame member 100 having the two-stage buckling, a load which is applied to a portion where the buckling occurs in the first stage (i.e., the outward-side wall portion 103a, 104a and the outward-side rib portions 105a, 106a) is considerably larger than that which is applied to another portion where the buckling occurs in the second stage (i.e., the inward-side wall portions 103b, 104b and the outward-side ribs 105a, 106a), and a stress concentration occurs at these portions, for example. In the present embodiment, since the node portions 111-114 are positioned on respective central portions, in the vehicle width direction, of the upper wall 103, the upper-side lateral rib 105, the lower-side lateral rib 106, and the lower wall 104, when viewed in the longitudinal direction, the buckling load of the portions where the stress concentration occurs in the frame member 100 is large. Particularly, by setting the ratio W2/W1 of the width W2 of the outward-side wall portions 103a, 104a relative to the whole width W1 at 15-50%, the present operation/effect can be obtained properly as described above.

Figure 5:
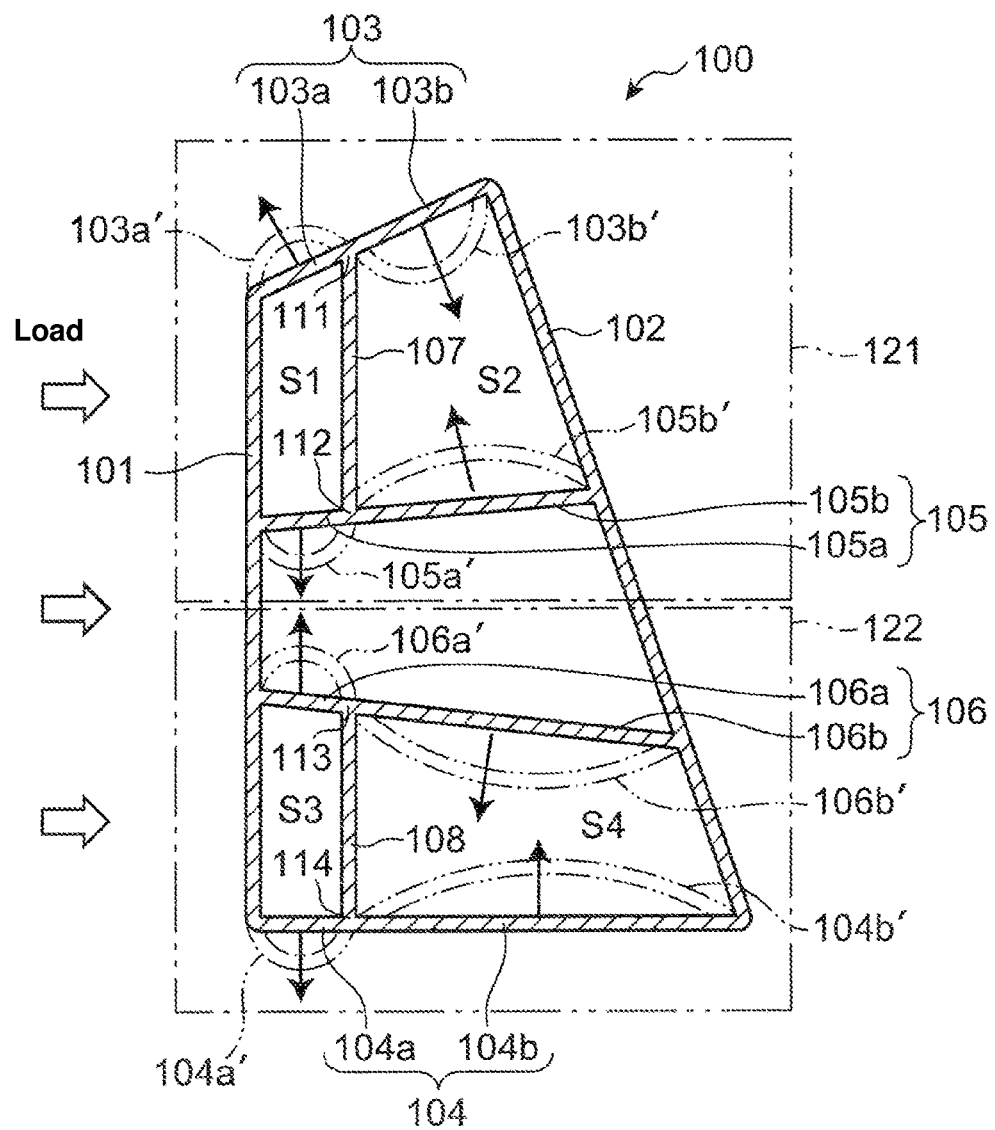
FIG. 5 is a sectional view showing a buckling direction of each wall portion and each rib portion in a side collision.

Next, buckling directions of the outward-side wall portions 103a, 104a, the outward-side rib portions 105a, 106a, the inward-side wall portions 103b, 104b, and the inward-side rib portions 105b, 106b which are respectively provided by the node portions 111-114 will be described referring to FIG. 5.

First, in a case where the lateral ribs 105, 106 and the vertical ribs 107, 108 are not provided in the frame member 100 (i.e., the node portions 111-114 are not provided), the upper wall 103 is bent upward and the lower wall 104 is bent downward. Next, in a case where the vertical ribs 107, 108 are provided in the frame member 100 (i.e., the node portions 111, 114 are provided), the outward-side wall portion 103a of the upper wall 103 is bent upward, the inward-side wall portion 103b positioned on the inward side of the node portion 111 is bent downward, the outward-side wall portion 104a of the lower wall 104 is bent downward, and the inward-side wall portion 104b positioned on the inward side of the node portion 114 is bent upward.

Further, in a case where the lateral ribs 105, 106 are provided in the frame member 100 (i.e., the node portions 112, 113 are provided), there is a difference in the bending direction between the outward-side rib portions 105a, 106a and the inward-side rib portions 105b, 106b. Since the upper-side lateral rib 105 of the frame member 100 extends upward from the outward side toward the inward side in the vehicle width direction, when viewed in the longitudinal direction, downward bending of the outward-side rib portion 105a becomes easier (a position after bending is denoted by a reference character 105a') and upward bending of the inward-side rib portion 105b becomes easier (a position after bending is denoted by a reference character 105b'). Further, since the lower-side lateral rib 106 extends downward from the outward side toward the inward side in the vehicle width direction, when viewed in the longitudinal direction, upward bending of the outward-side rib portion 106a becomes easier (a position after bending is denoted by a reference character 106a') and downward bending of the inward-side rib portion 106b becomes easier (a position after bending is denoted by a reference character 106b').

Thus, since the lateral ribs 105, 106 of the frame member 100 extend in non-parallel to each other such that they respectively slant relative to the first side wall 101, the buckling load of the frame member 100 can be made large by controlling the respective bending directions of the outward-side rib portions 105a, 106a and the inward-side rib portions 105b, 106b of the lateral ribs 105, 106, when viewed in the longitudinal direction, to respective desired directions. Specifically, by controlling the bending directions of the respective plate portions such that the bending directions of the plate portions which are positioned adjacently, in the vehicle vertical direction, to each other (the outward-side wall portion 103a and the outward-side rib portion 105a, the outward-side wall portion 104a and the outward-side rib portion 106a, the inward-side wall portion 103b and the inward-side rib portion 105b, and the inward-side wall portion 104b and the inward-side rib portion 106b) are reverse, the buckling load can be made large.

In particular, since the present embodiment is configured such that the slant angles of the lateral ribs 105, 106 relative to the vehicle width direction are 1-20 degrees, the large buckling load and the stable buckling direction can be compatibly attained.

Herein, if it is considered that an upper-side bending portion 121 which is constituted by the upper wall 103 and the upper-side lateral rib 105 and a lower-side bending portion 122 which is constituted by the lower wall 104 and the lower-side lateral rib 106 are respectively integrated, when viewed in the longitudinal direction, the respective buckling directions in the case of the load being inputted from the outward side in the vehicle width direction match each other. That is, in the upper wall 103 and the lower-side lateral rib 106, the respective bending directions of the outward-side wall portion 103a and the outward-side rib portion 106a are the same, and the inward-side wall portion 103b and the inward-side rib portion 106b are the same. Likewise, in the upper wall 104 and the upper-side lateral rib 105, the respective bending directions of the outward-side wall portion 104a and the outward-side rib portion 105a are the same, and the inward-side wall portion 104b and the inward-side rib portion 105b are the same. Thereby, the loads applied to the upper-side bending portion 121 and the lower-side bending portion 122 can be uniformized, so that the buckling direction of the frame member 100 can be stabilized properly.

As described above, the frame member 100 can obtain the large buckling load, thereby having the high EA mass efficiency.

Embodiment 2

Figure 6:
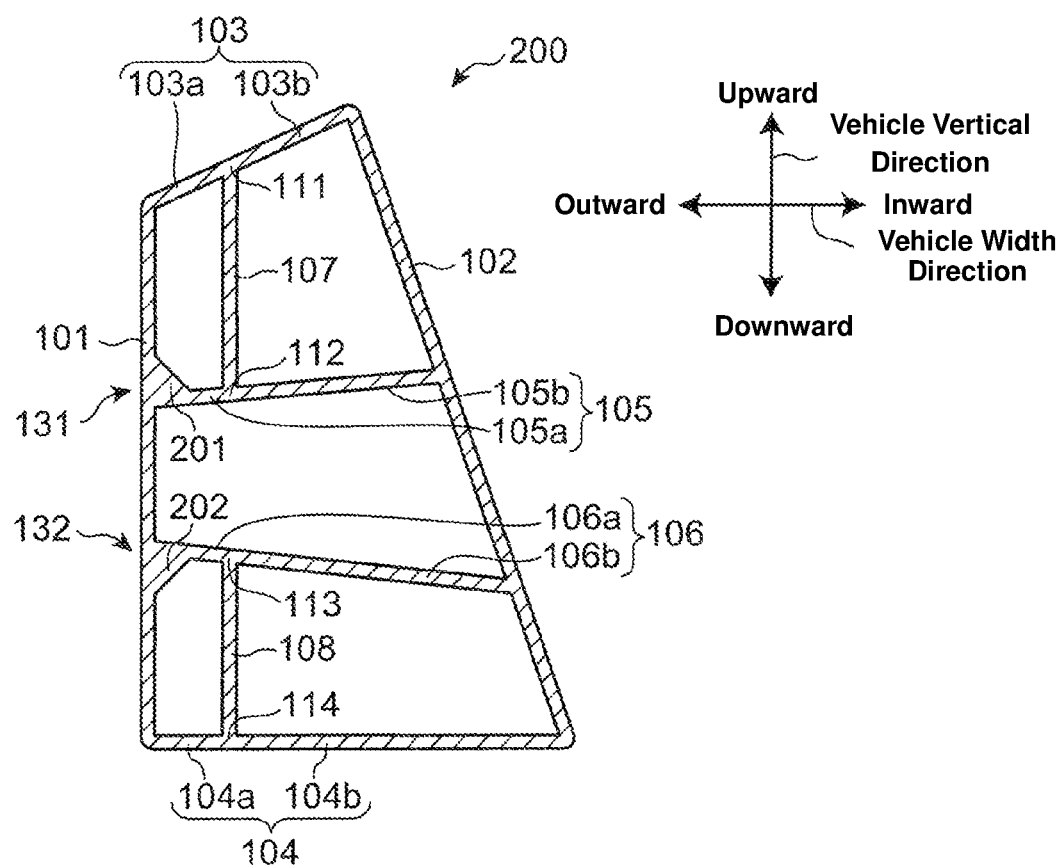
FIG. 6 is a sectional view showing a frame member according to a second embodiment of the present invention.
Figure 7:
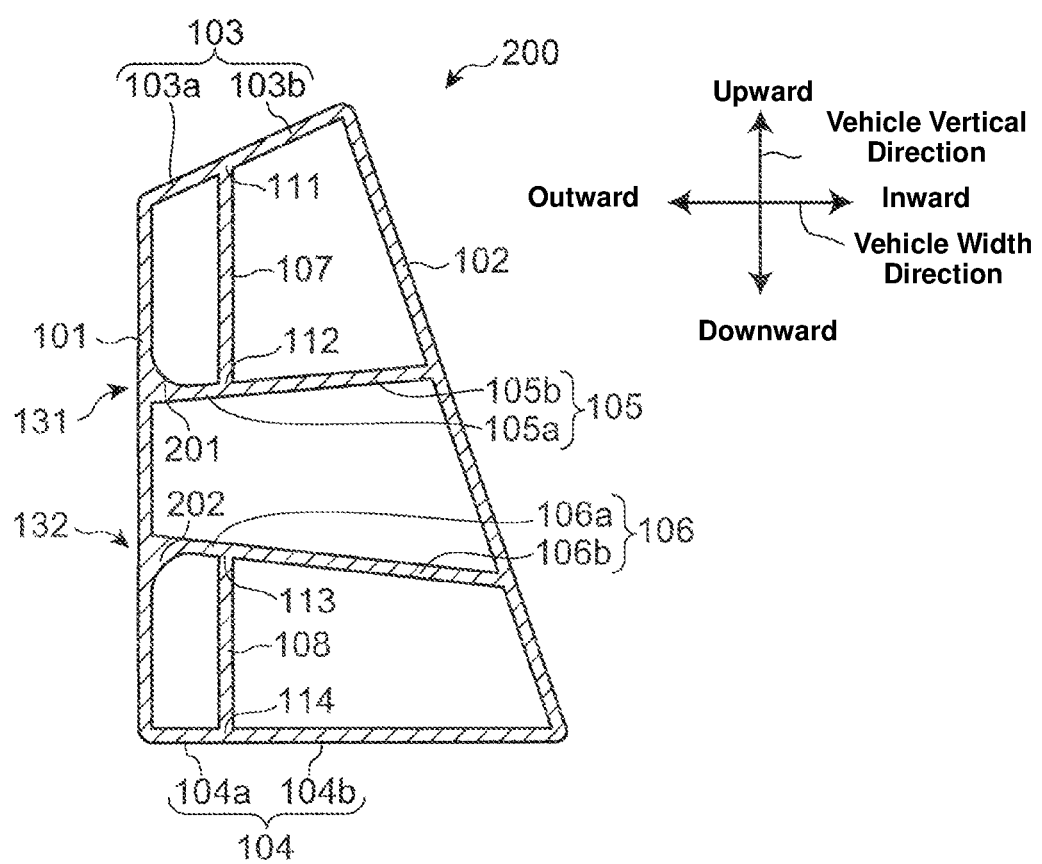
FIG. 7 is a sectional view showing the frame member according to the second embodiment of the present invention.
Figure 8:
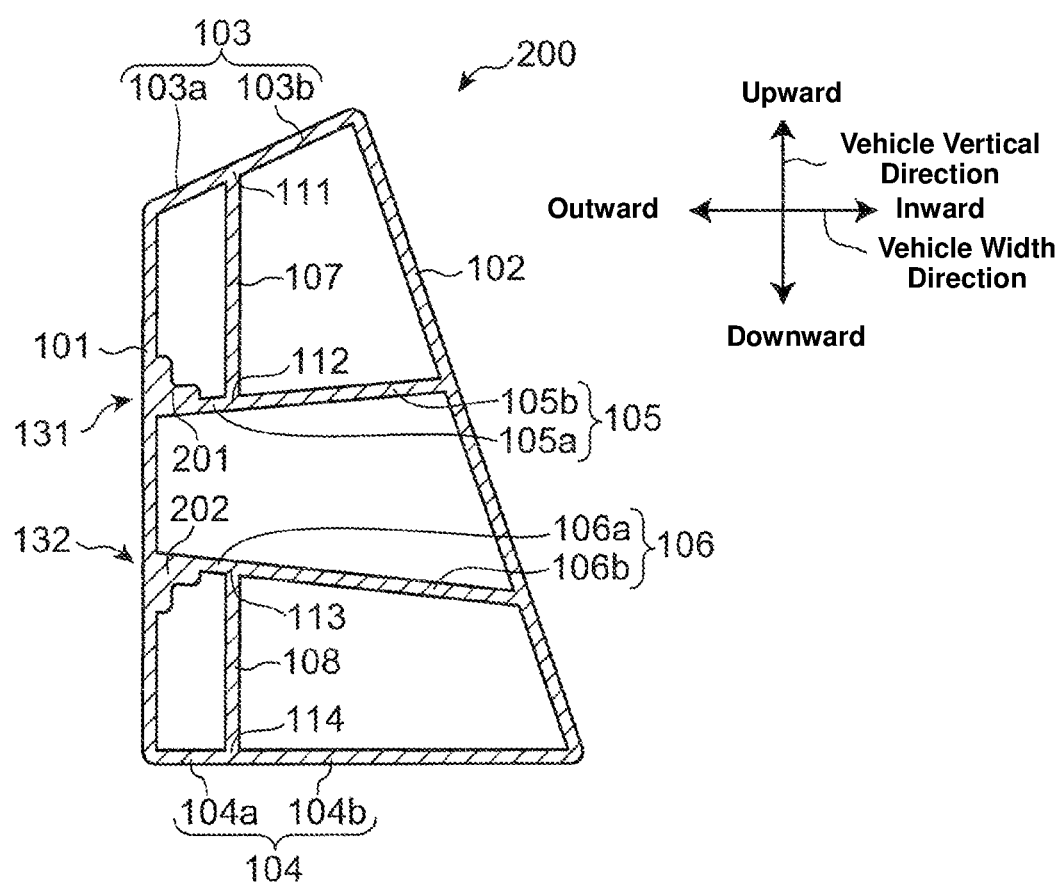
FIG. 8 is a sectional view showing the frame member according to the second embodiment of the present invention.

FIGS. 6 through 8 are sectional views showing a frame member 200 according to the second embodiment of the present invention. In descriptions of the frame member 200, the same structures as the first embodiment are denoted by the same reference characters, specific descriptions of which are omitted here.

In the frame member 200, a high strength portion which has a higher strength than a surrounding portion of the first side wall 101 and the upper-side lateral rib 105 is provided at a corner portion 131 which has an acute angle between the first side wall 101 and the upper-side lateral rib 105. Further, a high strength portion which has a higher strength than a surrounding portion of the first side wall 101 and the lower-side lateral rib 106 is provided at a corner portion 132 which has an acute angle between the first side wall 101 and the lower-side lateral rib 106. Specifically, thick portions 201, 202 as the above-described high strength portion which respectively have a larger thickness than the surrounding portions are provided at the corner portions 131, 132 of the frame member 200 as shown in FIGS. 6 through 8. The thick portions 201, 202 may be formed in a triangular shape, when viewed in the longitudinal direction, as shown in FIG. 6 or may have a corner-smooth round shape as shown in FIG. 7. Alternatively, the corner portions 131, 132 may be made of a thicker plate as a whole as shown in FIG. 8.

The corner portions 131, 132 have the high strength portions in the frame member 200, so that when the load is inputted from the outward side in the vehicle width direction, the upward buckling of the outward-side rib portion 105a is suppressed and also the downward buckling of the outward-side rib portion 106a is suppressed. Thereby, the outward-side rib portion 105a is easily bent downward and the inward-side rib portion 105b is easily bent upward. Further, the outward-side rib portion 106a is easily bent upward and the inward-side rib portion 106b is easily bent downward. Thus, according to the frame member 200, the buckling directions of the plural plate portions are securely controlled such that the buckling directions of the plate portions which are positioned adjacently, in the vehicle vertical direction, to each other are reverse, so that the large buckling load can be obtained and therefore the high EA mass efficiency can be obtained.

Embodiment 3

Figure 9:
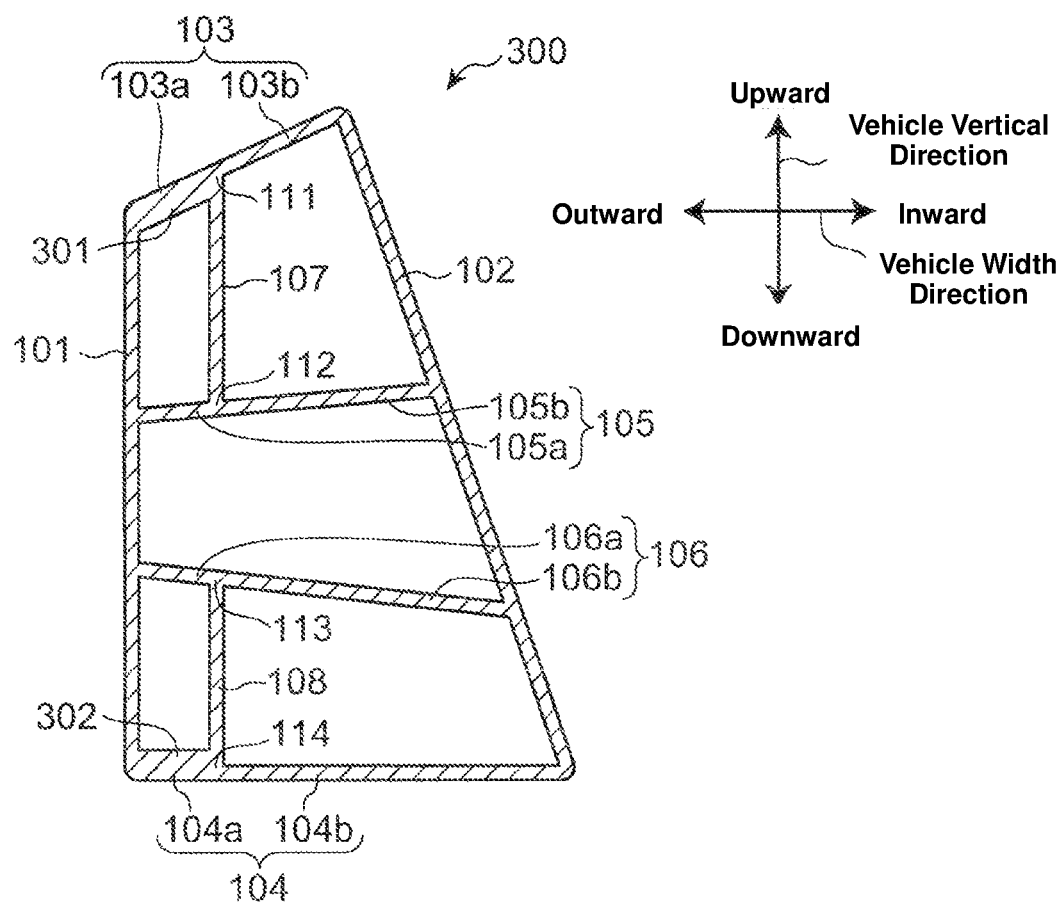
FIG. 9 is a sectional view showing a frame member according to a third embodiment of the present invention.

FIG. 9 is a sectional view showing a frame member 300 according to a third embodiment of the present invention. In descriptions of the frame member 300, the same structure as the first and second embodiments are denoted by the same reference characters, specific descriptions of which are omitted.

The frame member 300 shown in FIG. 9 comprises, similarly to the frame member 100 shown in FIG. 1, the first side wall 101, the second side wall 102, the upper wall 103, the lower wall 104, the upper-side lateral rib 105, the lower-side lateral rib 106, the upper-side vertical rib 107, and the lower-side vertical rib 108. Further, in the frame member 300, respective reinforcement portions are provided at the upper-side wall portion 103a of the upper wall 103 and the outward-side wall portion 104a of the lower wall 104. Specifically, respective thick portions 301, 302 as the reinforcement portion are provided at the outward-side wall portions 103a, 104a of the frame member 300. The thick portions 301, 302 are respectively provided at a lower face of the upper wall 103 and an upper face of the lower wall 104. The plate thickness of the outward-side wall portion 103a and the outward-side wall portion 104a where the thick portions 301, 302 are respectively provided may be more than twice thicker than that of the inward-side wall portion 103b and the inward-side wall portion 104b where the thick portions 301, 302 are not provided.

While FIG. 9 shows an example where the thick portions 301, 302 are provided at respective whole parts of the outward-side wall portion 103a and the outward-side wall portion 104a, the thick portions 301, 302 may be provided at respective parts of the outward-side wall portion 103a and the outward-side wall portion 104a as a modified example.

Figure 10:
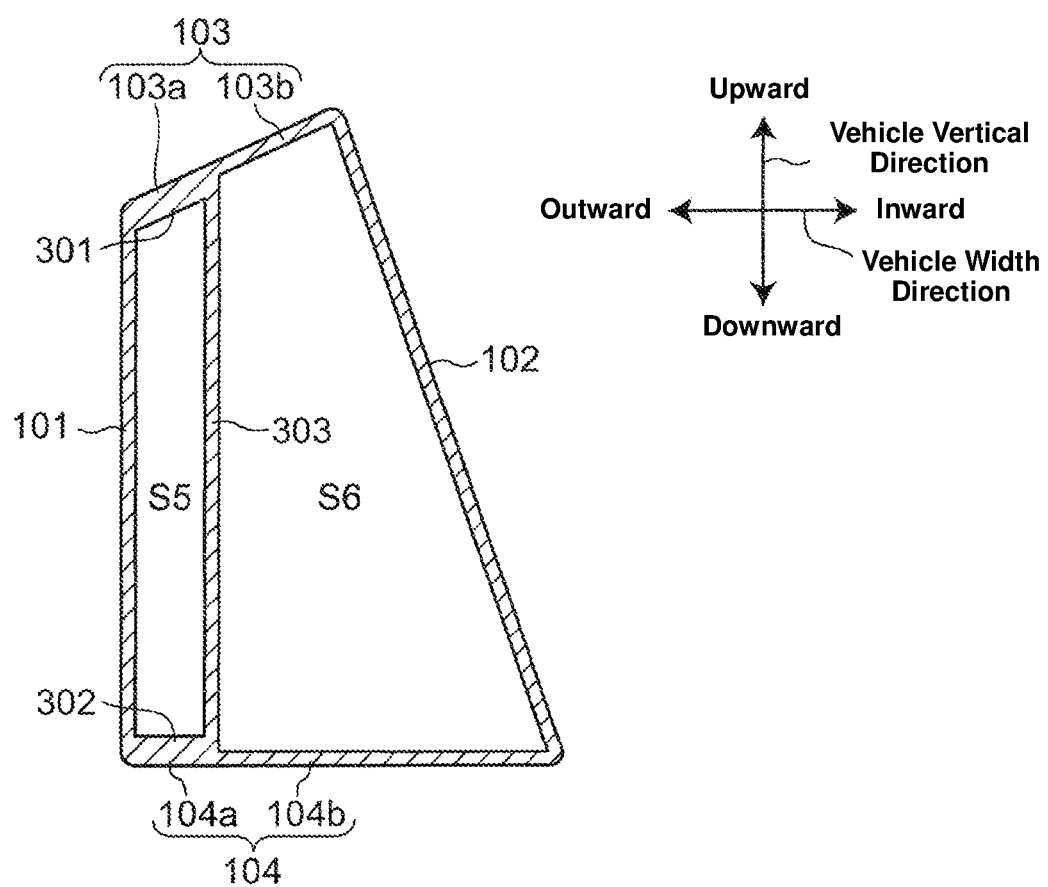
FIG. 10 is a sectional view showing a frame member according to a modified embodiment of the third embodiment of the present invention.

Herein, while the third embodiment exemplifies the frame member 300 which comprises the first side wall 101, the second side wall 102, the upper wall 103, the lower wall 104, the upper-side lateral rib 105, the lower-side lateral rib 106, the upper-side vertical rib 107, and the lower-side vertical rib 108, the upper-side lateral rib 105 and the lower-side lateral rib 106 may be omitted as a modified example as shown in FIG. 10. In this modified example, the upper-side vertical rib 107 and the lower-side vertical rib 108 are integrated, and a single vertical rib 303 which extends in the vehicle vertical direction (or which slants relative to the vehicle vertical direction, when viewed in the longitudinal direction) is provided. Herein, a closed cross section which is partitioned by the first side wall 101, the second side wall 102, the upper wall 103, and the upper-side lateral rib 105 is divided into two closed cross sections S5, S6 by the vertical rib 303. The frame member 300 has two-stage buckling with a fulcrum of the node portions 111, 114 when a load is inputted to the first side wall 101 from the outward side in the vehicle width direction in such a manner that the closed cross section S5 has bucking first, and subsequently the closed cross section S6 has buckling.

Further, beads which respectively extend in the vehicle width direction may be provided as the reinforcement portion in place of the thick portions 301, 302. In particular, in a case where the frame member 300 is made by press forming, the bead can be formed easily.

The frame member 300 has the two-stage buckling with the fulcrum of the node portions 111-114 when the load is inputted from the outside in the vehicle width direction. In the frame member 300, the load applied to a portion where the bucking occurs in the first stage (i.e., the outward-side wall portions 103a, 104a and the outward-side rib portions 105a, 106a) is larger than the load applied to a portion where the bucking occurs in the second stage (i.e., the inward-side wall portions 103b, 104b and the outward-side rib portions 105a, 106a), or the stress concentration occurs at these portions. Since the reinforcement portions are respectively provided at the outward-side wall portion 103a of the upper wall 103 and the outward-side wall portion 104a of the lower wall 104 in the frame member 300, the buckling load of the portion where the stress concentration occurs when the load is inputted to the first side wall 101 from the outward side in the vehicle width direction can be large, so that the high EA mass efficiency can be obtained.

Embodiment 4

Figure 11:
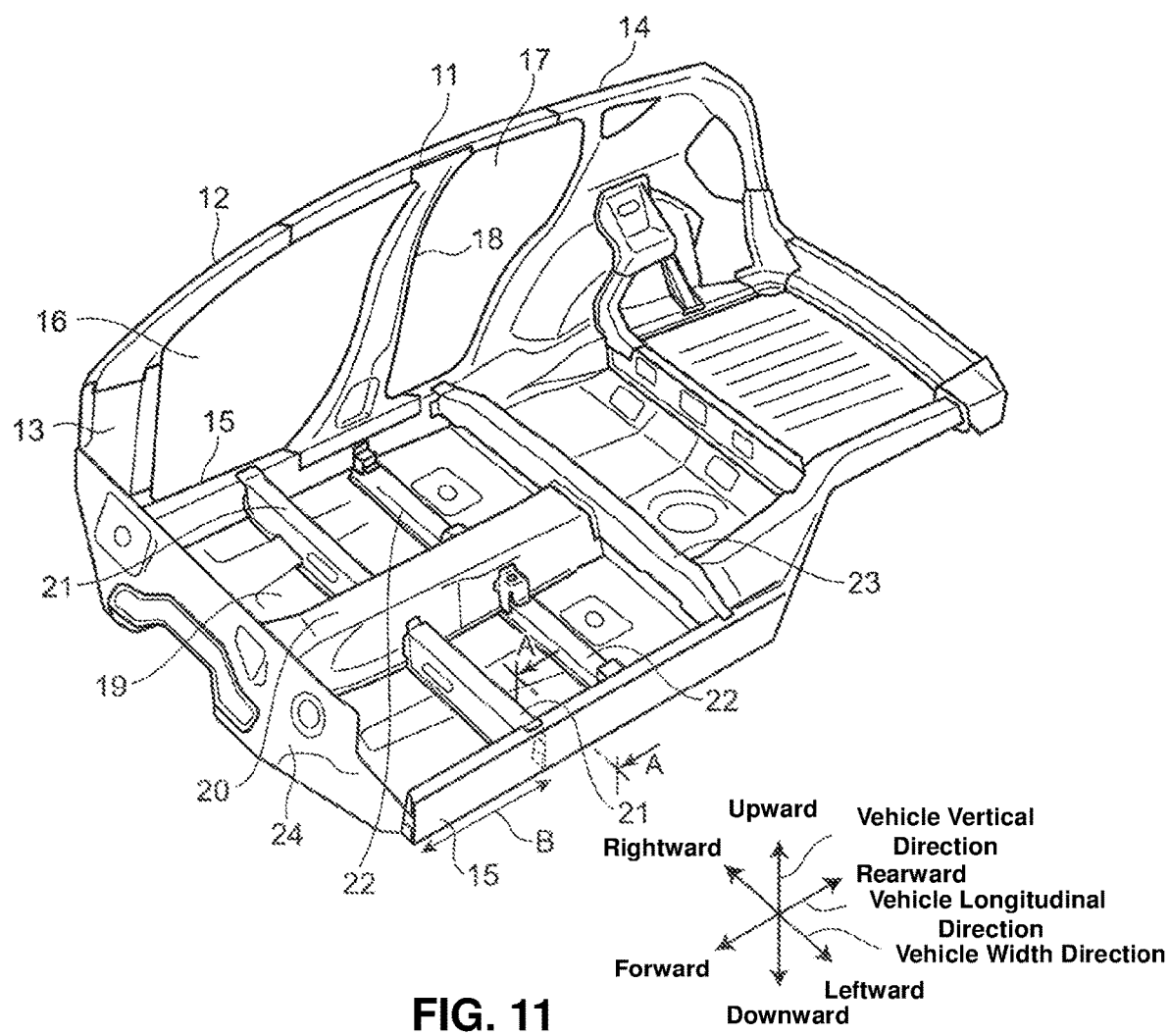
FIG. 11 is a perspective view of a part of a vehicle body to which a side vehicle-body structure according to a fourth embodiment of the present invention is applied, when viewed from a forward-and-leftward side.

FIG. 11 is a perspective view of a part of the vehicle body to which a side vehicle-body structure according to a fourth embodiment of the present invention is applied, when viewed from a forward-and-leftward side. A roof rail 11 which extends in the vehicle longitudinal direction at a vehicle-body upper portion is provided at a side (right-side) portion of the vehicle body. A front pillar 12 which extends forward is connected to a front end portion of the roof rail 11. A hinge pillar 13 which extends downward is connected to a front end portion of the front pillar 12. A rear pillar 14 which extends rearward and downward is provided at a rear end portion of the roof rail 11.

A pair of side sills 15 which extend in the vehicle longitudinal direction are provided at a vehicle-body lower portion on both end portions, in the vehicle width direction, of the vehicle. The side sill 15 is connected to the hinge pillar 13 which extends upward from a front end portion of the side sill 15 and the rear pillar 14 which extends upward from a rear end portion of the side sill 15.

A center pillar 18 which extends in the vehicle vertical direction and is connected to the roof rail 11 and the side sill 15 is provided between front-and-rear door opening portions 16, 17.

Herein, while a left-side side portion of the cabin has a similar structure to the right-side side portion, FIG. 11 illustrates the side sill 15 only, omitting the center pillar 18 and others, for easy recognition.

Next, a floor panel 19 which forms a bottom face of the cabin is provided. A tunnel reinforcement 20 which extends in the vehicle longitudinal direction is provided at a central portion, in the vehicle width direction, of the floor panel 19. Further, at this floor panel 19 are provided a No. 2 cross member 21, a No. 2.5 cross member 22, and a No. 3 cross member 23 which extend in the vehicle width direction and are positioned in order from the forward side toward the rearward side. These cross members 21, 22, 23 are provided to be spaced apart from each other in the vehicle longitudinal direction. Each of the cross members 21, 22, 23 is a frame member which protrudes toward a vehicle-body inside from an upper face of the floor panel 19 and has a hat-shaped cross section. Each of the No. 2 cross member 21 and the No. 2.5 cross member is provided separately on both sides of the tunnel reinforcement 20.

The cross members 21, 22, 23 are connected to the side sill 15, the floor panel 19, and the tunnel reinforcement 20. Thereby, respective closed cross sections which extend in the vehicle width direction over an area from the tunnel reinforcement 20 to the side sill 15 are formed between the cross members 21, 22, 23 and the floor panel 19. The side sill 15 is connected to the No. 2 cross member 21 substantially at a central position, in the vehicle longitudinal direction, between the hinge pillar 13 and the center pillar 18, connected to the No. 2.5 cross member 22 substantially at the same position, in the vehicle longitudinal direction, as the center pillar 18, and connected to the No. 3 cross member 23 substantially at a central position, in the vehicle longitudinal direction, between the center pillar 18 and the rear pillar 14.

Figure 12:
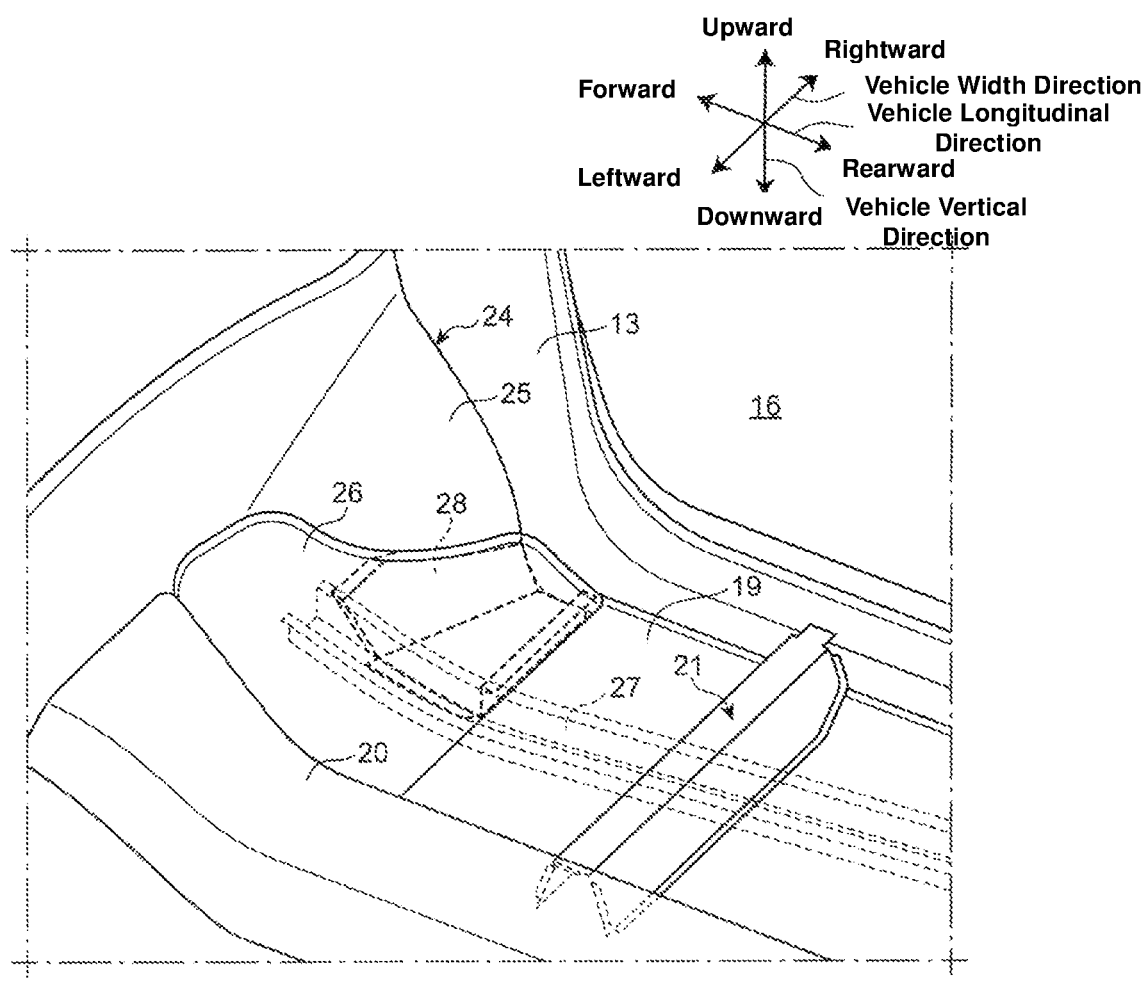
FIG. 12 is a perspective view of a part of the vehicle body to which the side vehicle-body structure according to the fourth embodiment of the present invention is applied, when viewed from a rearward-and-leftward side.

Next, as shown in FIG. 12, a dash panel 24 which partitions the cabin from the engine room is provided at a front portion of the cabin. The dash panel 24 comprises a dash panel upper 25 which is provided to rise from the floor panel 19 and a dash panel lower 26 which extends downward and rearward toward the floor panel 19 from a lower end portion of the dash panel upper 25.

Further, on a bottom-face side of the vehicle front portion, a front side frame 27 which extends in the vehicle longitudinal direction is provided at the floor panel 19 between the side sill 15 and the tunnel reinforcement 20. Moreover, a torque box 28 which is connected to the front side frame 27 and the side sill 15 is provided below the dash panel lower 26. The torque box 28 extends in the vehicle width direction and is configured to have a closed cross section. The torque box 28 serves as a member to reinforce a front portion of the floor panel 19. In the present embodiment, the torque box 28 is also an example of the cross member, in addition to the No. 2 cross member 21, the No. 2.5 cross member 22, and the No. 3 cross member 23.

Figure 13:
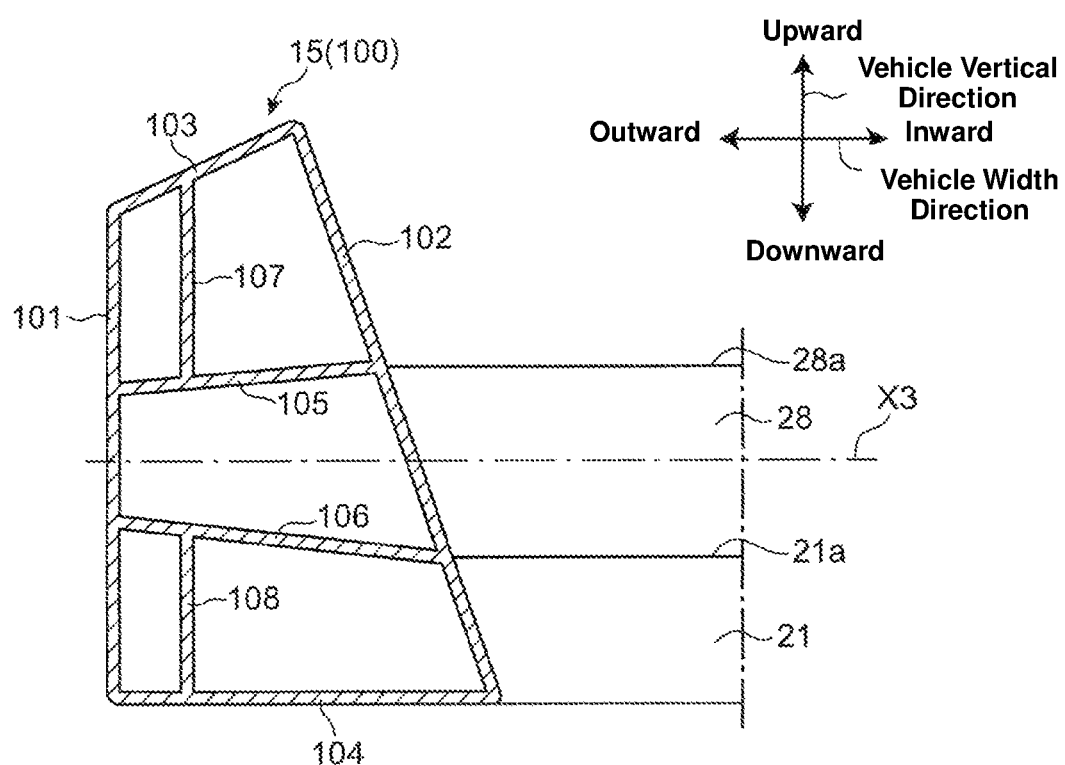
FIG. 13 is a sectional view taken along line A-A of a part of a vehicle body shown in FIG. 11.

Next, connection of the side sill 15 to the cross member will be described referring to FIG. 13. In the fourth embodiment, the side sill 15 may have a structure of any of the frame members 100, 200, 300 described in the present description. However, the side sill 15 comprises the upper-side lateral rib 105 and the lower-side lateral rib 106 in the fourth embodiment. In the following description, an example where the side sill 15 has the structure of the frame member 100 shown in FIG. 1 will be described (FIGS. 11, 13 show the example where the side sill 15 has the structure of the frame member 100 shown in FIG. 1 as well).

The upper-side lateral rib 105 of the side sill 15 is continuous to an upper face 28a of the torque box 28, when viewed in the longitudinal direction. The lower-side lateral rib 106 of the side sill 15 is continuous to an upper face 21a of the No. 2 cross member 21, when viewed in the longitudinal direction. Herein, the upper wall 103 of the side sill 15 may be continuous to an upper face 23a of the No. 3 cross member 23, when viewed in the longitudinal direction.

When the load is inputted to the first side wall 101 from the outward side, in the vehicle width direction, of the side sill 15 in the side collision, the load is transmitted to the second side wall 102 positioned on the inward side in the vehicle width direction by way of the upper wall 103, the upper-side lateral rib 105, the lower-side lateral rib 106 and the lower wall 104. Since the lateral ribs 105, 106 of the side sill 15 are provided to be continuous to the upper faces 28a, 21a of the cross members 28, 21, when viewed in the longitudinal direction, in the present embodiment, the load inputted from the first side wall 101 of the side sill 15 is properly transmitted to the cross members 28, 21 by way of the lateral ribs 105, 106, so that load dispersion to the respective portions of the vehicle body is attained.

In the fourth embodiment, the upper face 28a of the torque box 28 may be positioned at a higher level than a central portion, in the vehicle vertical direction, of the first side wall 101 (shown by a broken line X3 in FIG. 13), and the upper face 21a of the No. 2 cross member 21 may be positioned at a lower level than the central portion, in the vehicle vertical direction, of the first side wall 101. In this case, the load inputted from the first side wall 101 of the side sill 15 can be properly dispersed in the vehicle vertical direction, so that deformation of the side sill 15 is so suppressed that the buckling load can be improved.

Further, in the fourth embodiment, the upper-side lateral rib 105 and the lower-side lateral rib 106 of the side sill 15 may be provided between the torque box 28 and the No. 2 cross member 21 in the longitudinal direction (in an area denoted by reference character B in FIG. 11). In this case, the load dispersion to the respective portions of the vehicle body can be attained, achieving lightweight of the side sill 15. Alternatively, the upper-side lateral rib 105 and the lower-side lateral rib 106 of the side sill 15 may be provided over a whole part in the longitudinal direction.

OTHER EMBODIMENTS

While the present invention has been described by showing the above-described embodiments, it is not to be limited to these embodiments. The features of the respective embodiments may be combined freely. Further, various improvements, design change or deletion may be applied to the above-described embodiments.

What is claimed is:

1. A frame member for a vehicle which is configured to have a longitudinal direction thereof which extends in a vehicle longitudinal direction and have a closed cross section, the frame member comprising:
a first side wall;
a second side wall provided on an inward side, in a vehicle width direction, of the first side wall;
an upper wall and a lower wall, which are configured to form a structure of the closed cross section of the frame member together with the first side wall and the second side wall;
an upper-side lateral rib and a lower-side lateral rib, which are respectively provided between the upper wall and the lower wall to interconnect the first side wall and the second side wall and extend linearly, when viewed in the longitudinal direction of the frame member;
an upper-side vertical rib provided to face the first side wall and interconnect the upper wall and the upper-side lateral rib; and
a lower-side vertical rib provided to face the first side wall and interconnect the lower wall and the lower-side lateral rib,
wherein said upper-side lateral rib and said lower-side lateral rib are configured to extend in non-parallel to each other, when viewed in the longitudinal direction of the frame member.

2. The frame member for the vehicle of claim 1, wherein each of said upper-side vertical rib and said lower-side vertical rib is configured to have a node portion at a portion of each of said upper-side lateral rib and said lower-side lateral rib which is positioned on the outward side, in the vehicle width direction, of a central portion of each of the upper-side lateral rib and the lower-side lateral rib, when viewed in the longitudinal direction of the frame member.

3. A frame member for a vehicle which is configured to have a longitudinal direction thereof which extends in a vehicle longitudinal direction and have a closed cross section, the frame member comprising:
a first side wall;
a second side wall provided on an inward side, in a vehicle width direction, of the first side wall;
an upper wall and a lower wall, which are configured to form a structure of the closed cross section of the frame member together with the first side wall and the second side wall;
an upper-side lateral rib and a lower-side lateral rib, which are respectively provided between the upper wall and the lower wall to interconnect the first side wall and the second side wall and extend linearly, when viewed in the longitudinal direction of the frame member;
an upper-side vertical rib provided to face the first side wall and interconnect the upper wall and the upper-side lateral rib; and
a lower-side vertical rib provided to face the first side wall and interconnect the lower wall and the lower-side lateral rib,
wherein each of said upper-side vertical rib and said lower-side vertical rib is configured to have a node portion at a portion of each of said upper wall and said lower wall which is positioned on an outward side, in the vehicle width direction, of a central portion of each of the upper wall and the lower wall, when viewed in the longitudinal direction of the frame member, and
wherein a reinforcement portion is provided at a portion of each of said upper wall and said lower wall which is positioned on the outward side, in the vehicle width direction, of said node portion, when viewed in the longitudinal direction of the frame member.

4. The frame member for the vehicle of claim 3, wherein said reinforcement portion provided at said upper wall is a thick portion which is provided at a portion of a lower face of the upper wall, and an upper face of the upper wall is a flat surface.

5. The frame member for the vehicle of claim 1, wherein said first side wall extends in a vehicle vertical direction, when viewed in the longitudinal direction of the frame member, and said upper-side lateral rib extends upward and inward, in the vehicle width direction, when viewed in the longitudinal direction of the frame member, and said lower-side lateral rib extends downward and inward, in the vehicle width direction, when viewed in the longitudinal direction of the frame member.

6. The frame member for the vehicle of claim 1, wherein a high-strength portion is provided at each of a corner portion of said first side wall and said upper-side lateral rib and a corner portion of said first side wall and said lower-side lateral rib, each corner portion being configured to have an acute angle.

7. The frame member for the vehicle of claim 1, wherein at least one of said upper-side lateral rib and said lower-side lateral rib is configured to slant with a slant angle of 1-20 degrees relative to the vehicle width direction, when viewed in the longitudinal direction of the frame member.

8. The frame member for the vehicle of claim 1, wherein a vehicle-vertical direction of buckling which occurs at an upper-side bending portion which is constituted by said upper wall and said upper-side lateral rib when a load is inputted to the upper-side bending portion from an outward side, in the vehicle width direction, of the frame member is configured to match a direction of buckling which occurs at a lower-side bending portion which is constituted by said lower wall and said lower-side lateral rib when the load is inputted to the lower-side bending portion from the outward side in the vehicle width direction, when viewed in the longitudinal direction of the frame member.

9. A frame member for a vehicle which is configured to have a longitudinal direction thereof which extends in a vehicle longitudinal direction and have a closed cross section, the frame member comprising:
  a first side wall;
  a second side wall provided on an inward side, in a vehicle width direction, of the first side wall;
  an upper wall and a lower wall, which are configured to form a structure of the closed cross section of the frame member together with the first side wall and the second side wall; and
  an upper-side lateral rib and a lower-side lateral rib, which are respectively provided between the upper wall and the lower wall to interconnect the first side wall and the second side wall, when viewed in the longitudinal direction of the frame member,
  wherein node portions which respectively form inward-side plate portions and outward-side plate portions are provided at said upper wall, said upper-side lateral rib, said lower-side lateral rib, and said lower wall, plural outward-side plate portions of said outward-side plate portions which are positioned adjacently, in a vehicle vertical direction, to each other have reverse directions of buckling which respectively occur when a load is inputted from an outward side, in the vehicle width direction, of the frame member, and plural inward-side plate portions of said inward-side plate portions which are positioned adjacently, in the vehicle vertical direction, to each other have reverse directions of buckling which respectively occur when the load is inputted from the outward side in the vehicle width direction.

* * * * *